US011968965B2

(12) United States Patent
Szczesny

(10) Patent No.: US 11,968,965 B2
(45) Date of Patent: Apr. 30, 2024

(54) SWIMSPLASH SOLAR LURE

(71) Applicant: Leonard Charles Szczesny, Gouldsboro, PA (US)

(72) Inventor: Leonard Charles Szczesny, Gouldsboro, PA (US)

( * ) Notice: Subject to any disclaimer, the term of this patent is extended or adjusted under 35 U.S.C. 154(b) by 435 days.

(21) Appl. No.: 16/873,910

(22) Filed: Aug. 10, 2020

(65) Prior Publication Data
US 2020/0404894 A1    Dec. 31, 2020

(51) Int. Cl.
*A01K 85/12*    (2006.01)
*H02S 10/40*    (2014.01)
*H02S 40/38*    (2014.01)

(52) U.S. Cl.
CPC .......... *A01K 85/128* (2022.02); *H02S 10/40* (2014.12); *H02S 40/38* (2014.12)

(58) Field of Classification Search
CPC ............................ A01K 85/00; A01K 85/1893
USPC .......................................................... 43/26.2
See application file for complete search history.

(56) References Cited

U.S. PATENT DOCUMENTS

| 4,625,447 | A  | * | 12/1986 | Buchanan | A01K 85/01 43/17.1 |
| 6,807,766 | B1 | * | 10/2004 | Hughes | A61F 5/48 43/42.22 |
| 9,072,285 | B1 | * | 7/2015  | Rye | A01K 85/00 |
| 9,485,975 | B1 | * | 11/2016 | Rye | A01K 85/12 |
| 11,102,964 | B1 | * | 8/2021 | Gerardo | A01K 85/01 |
| 2004/0200125 | A1 | * | 10/2004 | Albanito | A01K 85/01 43/42 |
| 2007/0220798 | A1 | * | 9/2007 | Davidson | A01K 91/20 43/43.12 |
| 2011/0061287 | A1 | * | 3/2011 | Ogawa | A01K 85/01 43/4.5 |
| 2016/0007581 | A1 | * | 1/2016 | Davidson | A01K 85/01 359/809 |
| 2018/0368375 | A1 | * | 12/2018 | Folkersen | A01K 85/01 |

FOREIGN PATENT DOCUMENTS

| CN | 104996383 | A  | * | 10/2015 | |
| CN | 206078695 | U  | * | 4/2017  | |
| CN | 110312422 | A  | * | 10/2019 | ............. A01K 85/00 |
| DE | 202021100073 | U1 | * | 5/2022 | ............. A01K 85/01 |
| JP | 2004357526 | A  | * | 12/2004 | |
| JP | 2017085961 | A  | * | 5/2017  | |
| WO | WO-2021160219 | A1 | * | 8/2021 | ............. A01K 85/01 |

* cited by examiner

Primary Examiner — Christopher P Ellis

(57) ABSTRACT

Top water and deep diving fishing lures have been around for many years. The improvement on them is placing a tiny motor inside the lure with a barbed shaft extending out the back that is used to push on a molded soft rubber tail that spins, splashes the water and pulls the lure backwards towards the casted hot spot area as it is powered by a tiny solar panel, (But not limited to) as it can be powered by a battery. The improvement is the molded soft rubber tail thats connected to the tiny solar panel motor or battery causing it to spin, splash the water and pull the lure backwards, keeping it in that casted hot spot area like something stuck on the water and trying to get out by swimming to safety with that SwimSplash action.

6 Claims, 4 Drawing Sheets

SWIMSPLASH SOLAR LURE

BACKGROUND

The present invention deals with top water fishing lures having optional diving capabilities to be enacted by a user during operation. Diving of these lures occurs during retrieval; wherein a forwardly attached bill will interact with the water causing the lure to dive. Many top-water, lures exist, however the prior art does not disclose a solar powered lure having the ability to move in reverse while on the water's surface toward the original casting area or "hot spot".

DETAILED DESCRIPTION

Figure 1A:
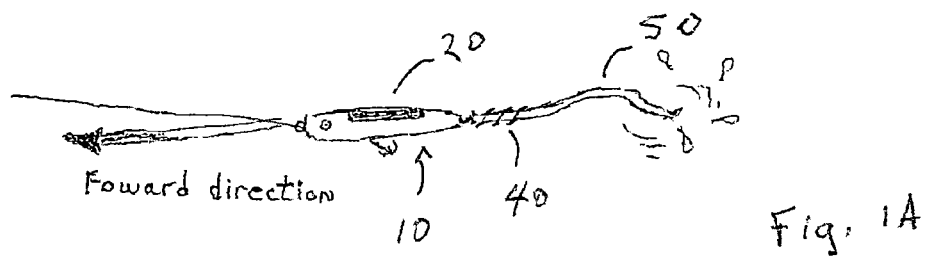
FIGS. 1A-1C show the feather light floating plastic lure of the present invention while in use.
Figure 1B:
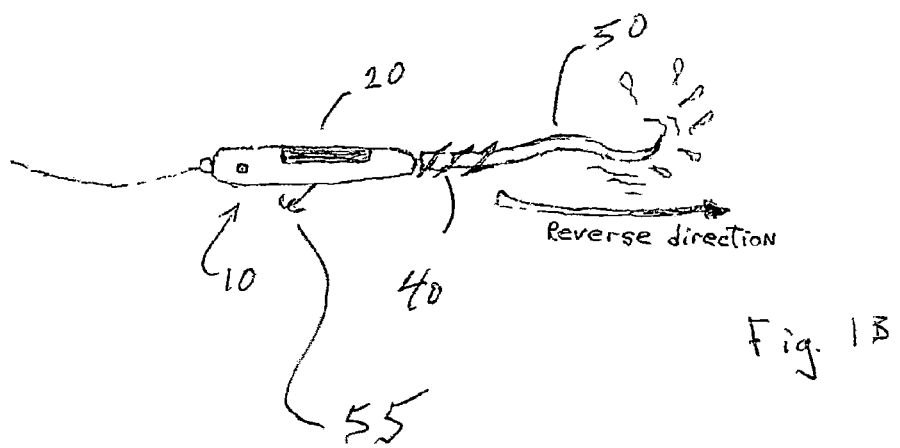
Figure 1C:
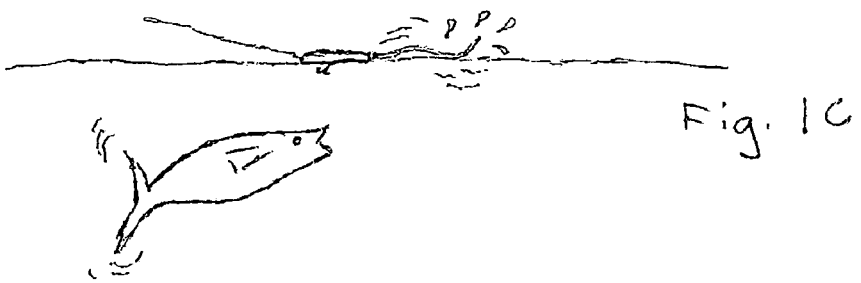
Figure 4A:
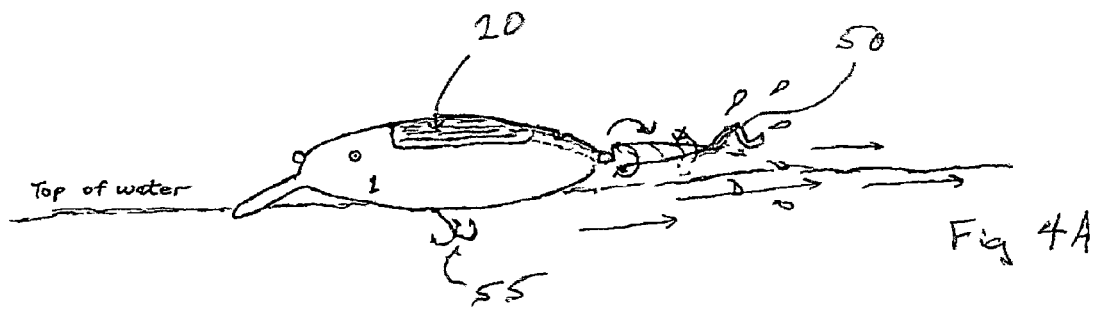
FIG. 4 shows another embodiment of the lure, while in use, including a bill or diving plane.
Figure 4B:
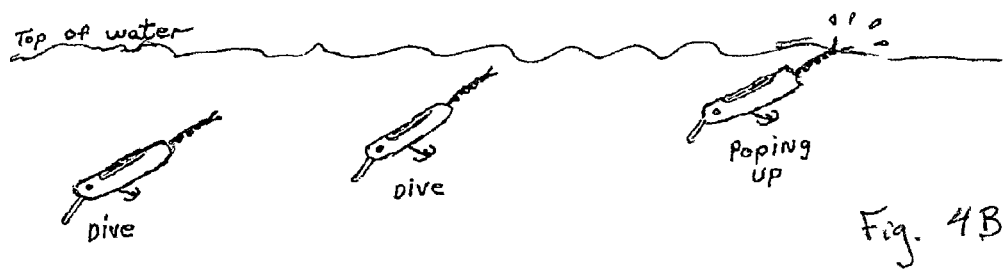
Figure 4C:
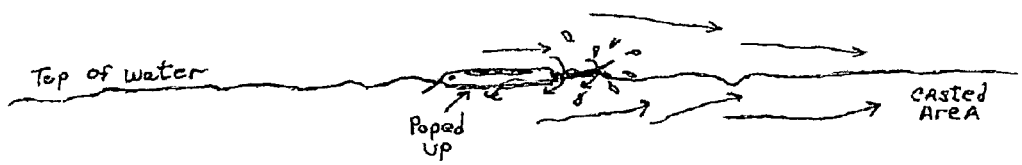

The "swimsplash" lure of the invention is shown in use in FIGS. 1A-1C, and in FIGS. 4A-4C (billed embodiment), where the lure 10 includes a small solar panel 20, connected to an associated motor 30. The motor is configured to drive a barbed shaft 35 attached thereto. A rubber worm-like tail 50, having ribs 40, is attached to said barbed shaft; wherein when the motor is activated the tail spins in response so that the ribs 40 interact with the water in a propeller-like manner thereby providing a rearward thrust that will carry the lure toward its original casted area, or "hot-spot". For example, a fisherman, or fisherwoman, will cast the lure to a targeted area, let the lure settle, then begin retrieval. During retrieval the lure will dive, if equipped with a bill, see FIG. 4A-4C, or will waggle across the top of the water with the tail in a spinning mode causing a splashing, life-like action, as shown in FIGS. 1 and 4. This desired life-like action is very difficult to duplicate by the user's hand alone, however, when using the inventive lure, said action comes automatically. If desired, the user may stop retrieval while allowing slack in the line thereby initiated a rearward movement of the lure toward the initially casted area. This movement will entice a targeted fish to strike.

Figure 2:
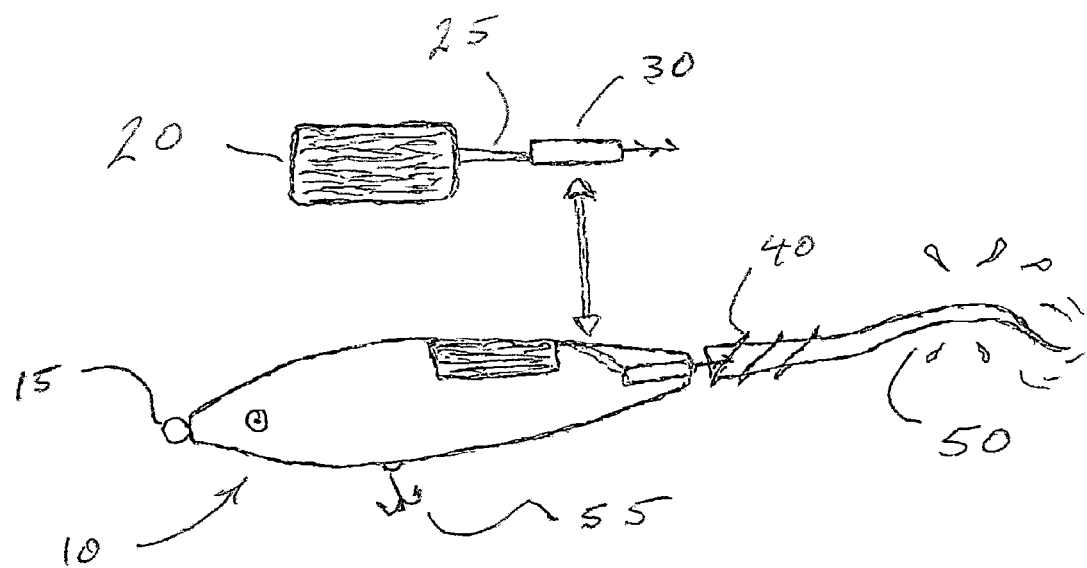
FIG. 2 shows the components of the claimed lure.

With reference to FIG. 2, all the components of the inventive lure are shown: Lure 10, has an eyelet 15 attached at its forward end for the purpose of attaching a fishing line, and a treble hook attached to a lower, belly area in a conventional manner. The mini solar panel is integrated within the body of the lure 10 with an associated motor 30 and necessary wiring 25 connecting the two. When in use, the motor 30 will continuously spin the barbed shaft 35 and attached flexible, (preferably rubber) tail 50 using electrical energy supplied by the solar energy panel 20. This continuous spinning of the tail 50, along with associated propeller-like ribs 40, provides an attractive splashing and a rearward movement upon demand.

It should be noted that an optional battery and switch (not shown), could be used in place of the electrical energy as supplied by the illustrated solar panel.

Figure 3:
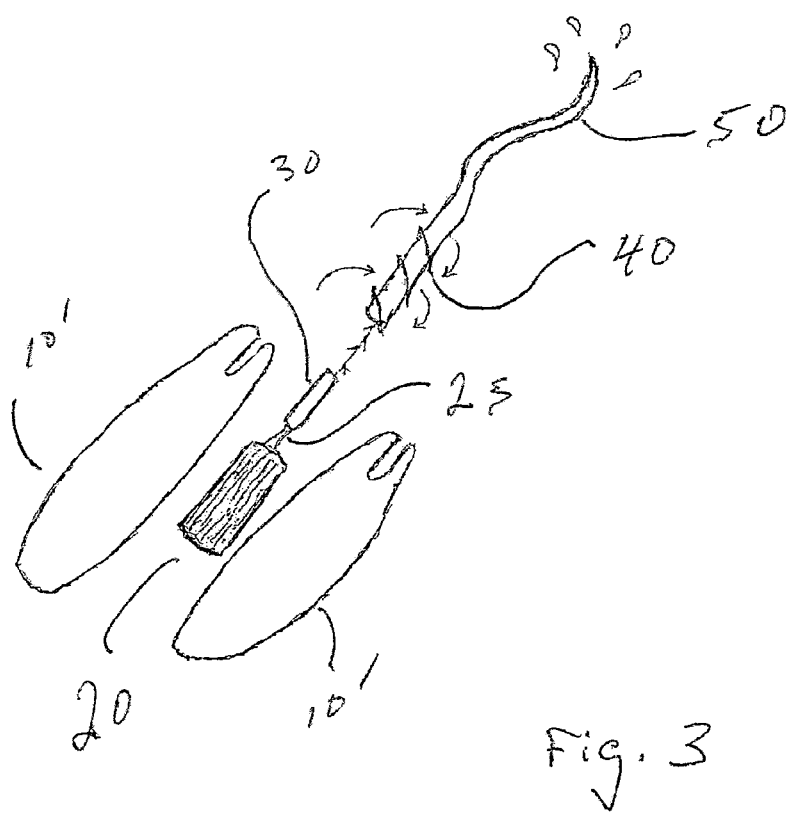
FIG. 3 shows the solar panel, motor and sides of the present invention being assembled.

FIG. 3 illustrates the inventive lure prior to assembly. The lure having two halves 10', could be closed upon the solar panel 20, wire and motor 30; thereby integrating the assembly into one, water-tight, sealed, unit. The assembly could take place using small fasteners, screws for example, a strong glue, or both. Any other conventional means of fastening the lure components could be used.

FIG. 4, as described above, illustrates the billed version of the inventive lure in action, i.e., being casted into a targeted area, then being retrieved and "worked" to dive. Further, being allowed to retreat to the targeted area thereby providing an enticing movement and splashing so as to increase the chances of catching a targeted fish.

The invention claimed is:

1. A fishing lure comprising:
   a body configured to house a motor;
   a solar panel located on an upper surface of said housing; said solar panel configured to provide power to said motor;
   said motor comprising a shaft extending outside of the housing;
   a soft flexible tail removably fixed to said shaft configured to spin in response to activation of said motor, thereby creating a splashing movement and providing propulsion;
   said propulsion acting to move said lure in a rearward direction to an original location;
   said original location being an area subsequent a casting of said lure by a user to a targeted area.

2. The fishing lure according to claim 1, wherein said soft flexible tail comprises ribs.

3. The fishing lure according to claim 2, wherein said ribs are formed circumferentially about said tail and are configured to act as a propeller in order to provide said propulsion.

4. The fishing lure according to claim 1, wherein said shaft comprises barbs configured to hold said tail in said removably fixed manner.

5. The fishing lure according to claim 1, wherein an optional battery and associated switch could be provided.

6. The fishing lure according to claim 1, further comprising a diving bill attached to a front face area of said lure.

* * * * *